United States Patent
Aguero et al.

(10) Patent No.: US 6,862,144 B1
(45) Date of Patent: Mar. 1, 2005

(54) AVIATOR'S NIGHT VISION IMAGING SYSTEM NON-ROTATIONAL OBJECTIVE LENS

(75) Inventors: Raymond Aguero, Roanoke, VA (US); Steven Andrew Brillhart, Vinton, VA (US); Mark Edwin Oesterreich, Roanoke, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/743,984

(22) Filed: Dec. 22, 2003

(51) Int. Cl.[7] ............................ G02B 15/15; G02B 7/02
(52) U.S. Cl. ...................................... 359/694; 359/823
(58) Field of Search ........................ 359/811, 822–830, 359/410, 425, 694

(56) References Cited

U.S. PATENT DOCUMENTS

| | | | | |
|---|---|---|---|---|
| 5,940,228 A | * | 8/1999 | Burnett | 359/825 |
| 6,122,099 A | | 9/2000 | Connors et al. | |
| 2001/0033431 A1 | * | 10/2001 | Tanioka | 359/696 |

* cited by examiner

*Primary Examiner*—Georgia Epps
*Assistant Examiner*—M. Hasan
(74) *Attorney, Agent, or Firm*—RatnerPrestia (57) ABSTRACT

A device for adjusting the position of a lens along an optical axis of the lens. The device has a lens housing for carrying the lens and a first knob positioned to rotate about the lens housing. A second knob is cooperatively threaded to the first knob such that rotation of the first knob relative to the second knob causes axial movement of the lens housing along the optical axis. A coupler couples the lens housing to the second knob to prevent the lens housing from rotating relative to the second knob when the first knob is rotated.

20 Claims, 11 Drawing Sheets

AVIATOR'S NIGHT VISION IMAGING SYSTEM NON-ROTATIONAL OBJECTIVE LENS

FIELD OF THE INVENTION

The present invention relates generally to a device for focusing an objective lens in an optical system such as a night vision imaging system. More particularly, it relates to a device which can focus the objective lens by moving it only in a translational direction and without rotating the objective lens.

BACKGROUND OF THE INVENTION

Figure 1:
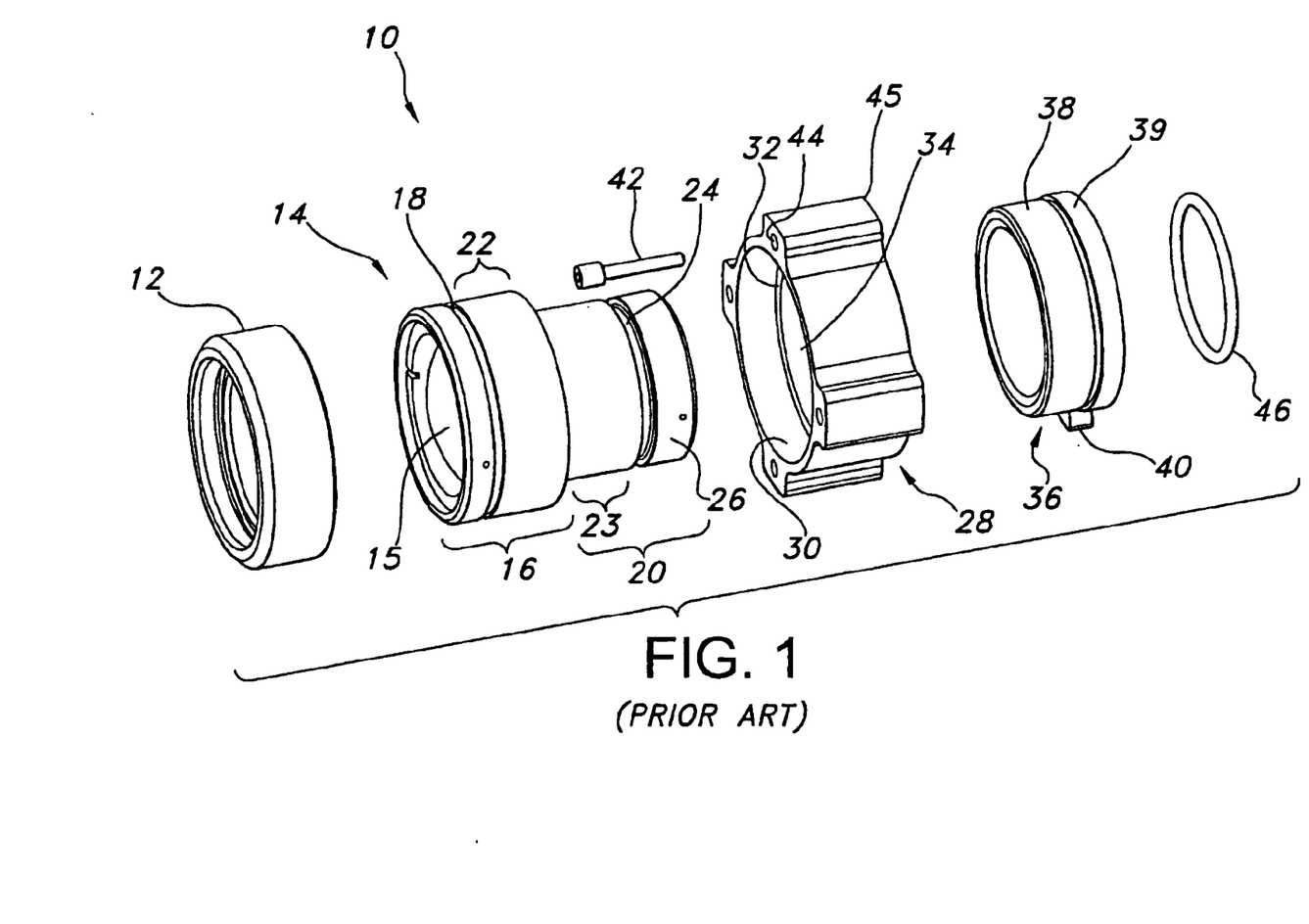
FIG. 1 is an exploded perspective view of a conventional device for focusing an objective lens.
Figure 2:
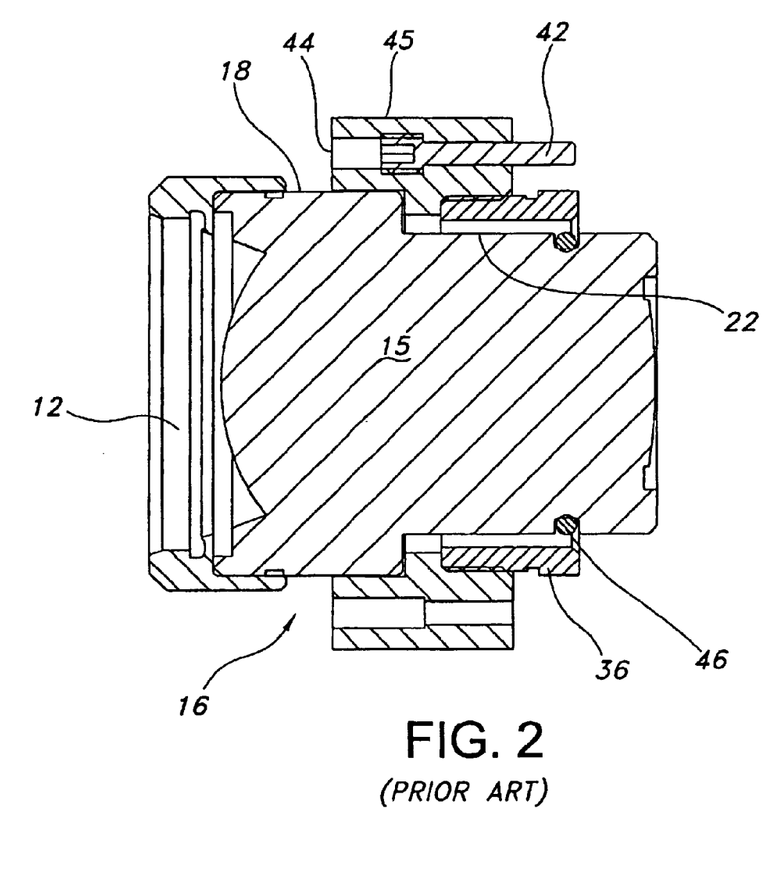
FIG. 2 is a cross-sectional view of a conventional device for focusing an objective lens.

The conventional device for focusing an objective lens in an optical system such as a night vision imaging system is shown in FIGS. 1 and 2. An objective lens 15, comprising as many as 5 or 6 individual lenses, is held inside a cylindrical objective cell or objective lens housing 14. A cylindrical LIF (light interference filter) 12 is bonded to a first segment 16 of the objective lens housing. A circumferential groove 18 around the outside surface of segment 16 receives a snapping feature (not shown in FIG. 1) of the LIF adaptor. A second segment 20 of the objective lens housing has an outside diameter that is smaller than the outside diameter of first segment 16. Second segment 20 is divided into two parts 23 and 26. Part 23 is adjacent part 22 of segment 16. Part 26 is adjacent circumferential groove 24 and includes the end of the objective cell. Circumferential groove 24 is formed around the outside surface of second segment 20 for receiving an O-ring 46.

A cylindrical first knob 28 is coupled to part of first segment 16 identified by reference 22. First knob 28 is a focus knob. Part 22 is bonded to the inside circumferential surface 30 of knob 28. Another inside segment 34 of the inside surface of knob 28 is threaded. A circumferential stop 32 separates the circumferential flat surface 30 from the circumferential threaded surface 34. A cylindrical second knob or stop adaptor 36 has a circumferential outside threaded surface 38 which may mate with the circumferential inside threaded surface 34 of knob 28.

After knob 28 is bonded to lens housing 14, stop adaptor 36 may be threaded onto knob 28. Stop adaptor 36 also has a circumferential outside smooth surface 39 which may be coupled to other parts of the night vision imaging system. When the stop adaptor is coupled to the remainder of the night vision imaging system, it does not rotate relative to the night vision system. That is, stop adaptor 36 is held stationary relative to the night vision system.

When the conventional device 10 is mounted into a night vision system, the user of the system may want to refocus the lenses inside lens housing 14 by moving the lenses in a translational direction along the optical axis of the lenses. The optical axis of the lenses is substantially parallel to the longitudinal axis of the lens housing 14. Since the stop adaptor 36 is held motionless relative to the night vision system, knob 28 may be rotated relative to stop adaptor 36 via the mating threads on the inner surface 34 of knob 28 with the threads on the outer surface 38 of the stop adaptor 36. Rotating the knob 28 will cause the knob to move in a translational direction with respect to stop adaptor 36. Because knob 28 is bonded to lens housing 14, the lens housing and its internal lenses will simultaneously move in a longitudinal translation direction along the optical axis of the lenses.

Knob 28 has a series of extensions 45 that extend outwardly from the outer surface of knob 28. The width of each extension 45 may be equal to be the width of knob 28. In an exemplary embodiment, there may be four extensions arranged at 90 degree intervals around the outer surface of knob 28. In an alternative embodiment, there may be more or fewer extensions 45. Each of the extensions 45 has a hole threaded into it. Threaded hole 44 extends completely through the entire width of extension 45. A threaded stop pin 42 may be threaded into any one of the threaded holes 44. The length of threaded stop pin 42 exceeds the width of extension 45. In fact, the length of stop pin 42 may be at least equal to the width of knob 28 plus the width of stop adaptor 36. The purpose of stop pin 42 is to prevent knob 28 from rotating more than one time relative to stop adaptor 36. This limitation of rotation function is accomplished because stop 40 prevents knob 28 from rotating any further when stop pin 42 bumps up against stop 40.

Because knob 28 is bonded to lens housing 14, rotation of knob 28 rotates lens housing 14 at the same time that it moves lens housing 14 in a translational direction. Because the conventional device causes the objective lens housing to rotate during focusing, the conventional device does not provide system compatibility with certain night vision imaging systems. Some systems require a rotationally stationary mounting. If these night vision systems are mounted to the conventional objective lens housing, the objective lens cannot be refocused without first removing the night vision system because the attached night vision system will not permit the lens housing to rotate.

To overcome the shortcomings of the conventional device, a new lens focusing device is provided.

SUMMARY OF THE INVENTION

The present invention is a device for adjusting the position of a lens along an optical axis of the lens. The device has a lens housing for carrying the lens to and a first knob positioned to rotate about the lens housing. A second knob is cooperatively threaded to the first knob such that rotation of the first knob relative to the second knob causes axial movement of the lens housing along the optical axis. A coupler couples the lens housing to the second knob to prevent the lens housing from rotating relative to the second knob when the first knob is rotated.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF THE INVENTION

Referring now to the drawing, like reference numbers refer to like elements described in the conventional device.

Figure 3:
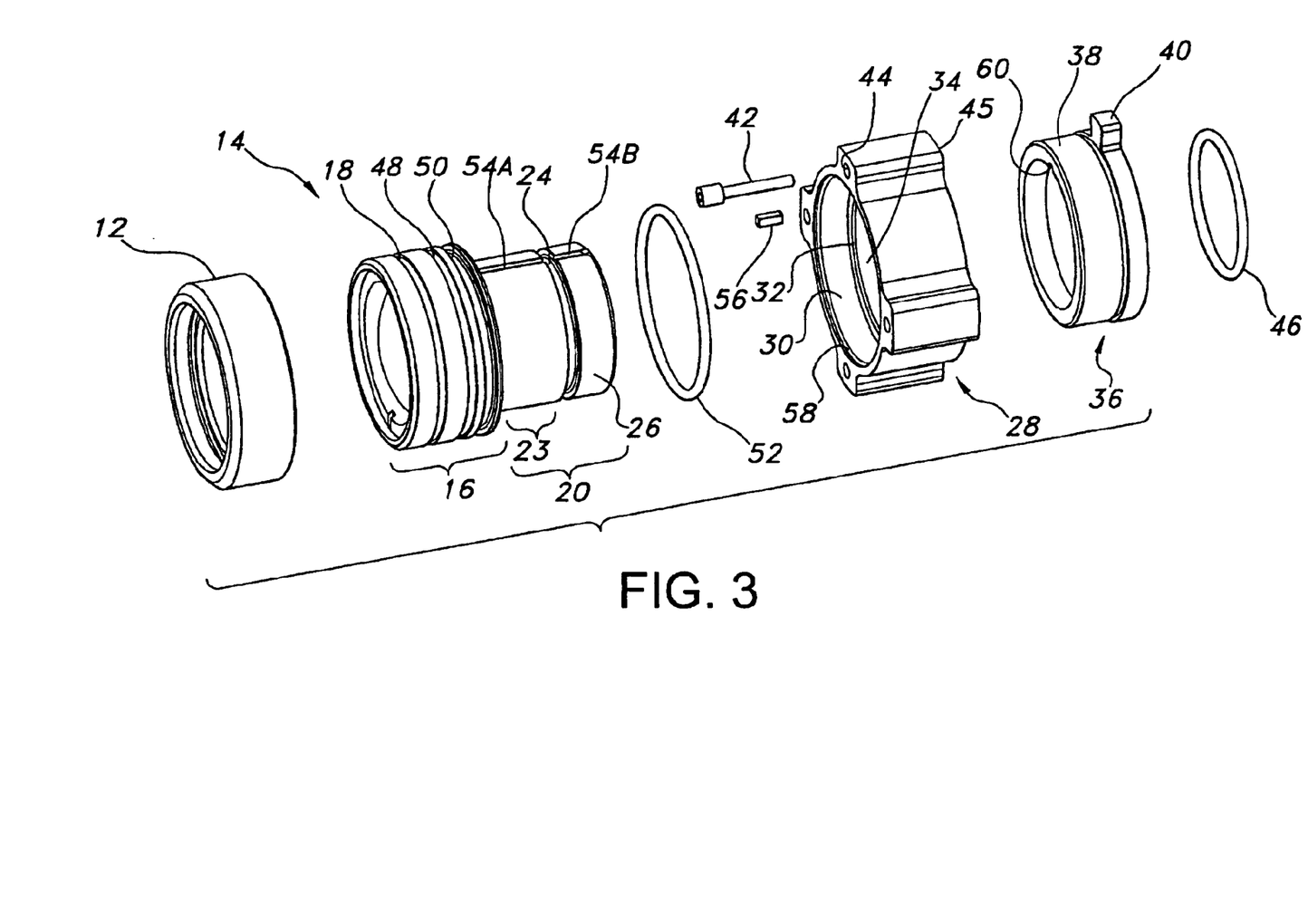
FIG. 3 an exploded perspective view of a device for focusing an objective lens according to an exemplary embodiment of the present invention.
Figure 4:
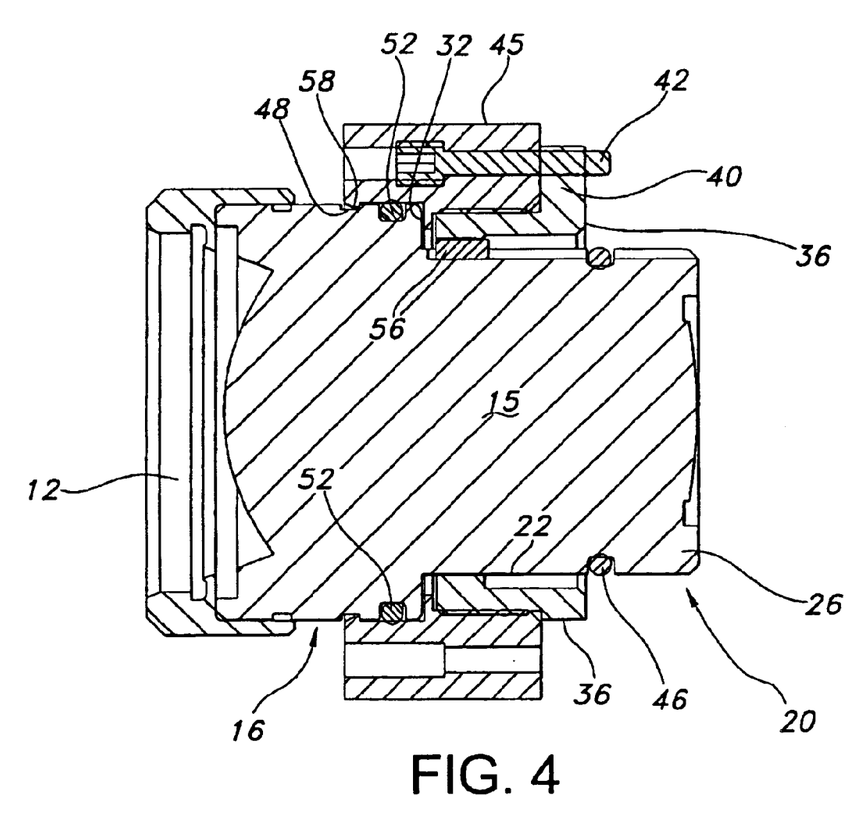
FIG. 4 is a cross-sectional view of the device illustrated in FIG. 3.

FIGS. 3 and 4 show a modified system for focusing an objective lens in an optical system such as a night vision system. The device has an LIF adapter 12 coupled to a lens housing 14 and a knob 28 and stop adapter 36 coupled to the lens housing. In an exemplary embodiment, LIF adapter 12 may be bonded to lens housing 14. First segment 16 of lens housing 14 has been modified to include a diametral, circumferential snap-in groove 48 within and around the outer surface of segment 16. Knob 28 has been modified to include a chamfered lip 58 on its leading edge. Chamfered lip 58 forms a circumferential protrusion around the inner surface of the knob. Circumferential protrusion 58 is just inside the edge of knob 28. When knob 28 is mounted onto lens housing 14, circumferential protrusion 58 may be snapped into circumferential snap-in groove 48. The interface between lip 58 and snap-in groove 48 prevents the objective cell lens housing from moving axially relative to knob 28. Once the knob is assembled to the lens housing 14, there will be no noticeable axial movement between them. Segment 16 of lens housing 14 has been further modified with a second circumferential groove 50 within and around the outer surface of segment 16. Circumferential groove 50 is adapted to receive an added O-ring 52.

The second segment 20 of objective lens housing 14 has been modified by forming a first channel including segments 54A and 64B within the outer surface of segment 20. In an exemplary embodiment, the first channel is a first axial groove or key way. Segments 54A a nd 54B may be separated by circumferential groove 24. Segment 54A of the first axial groove is formed in part 22 of segment 20 and segment 54B is formed in the end part 26 of the second segment. The longitudinal axis of first axial groove 54A, 54B is substantially parallel to the optical axis of the lens within lens housing 14. In an exemplary embodiment, segments 54A and 54B may be square shaped. In an alternative embodiment, they may be semi-circular.

Figure 5:
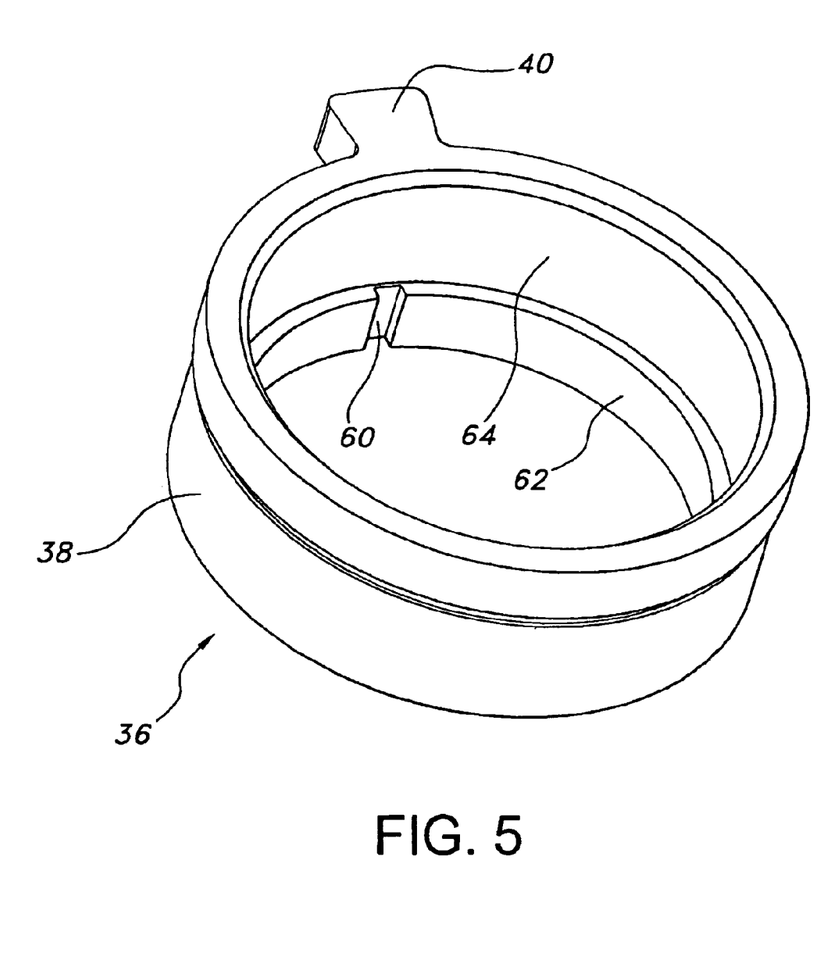
FIG. 5 is a perspective view of a stop adaptor for use in the device illustrated in FIG. 3.

Referring to FIGS. 3, 4, and 5, the inner surface of stop adaptor 36 is divided into two segments. The first segment is a smooth, unthreaded inner surface 62. The second segment is a threaded circumferential surface 64. Stop adaptor 36 has been modified by adding a second channel 60 within the smooth unthreaded inner surface 62. In an exemplary embodiment, second channel 60 is an axial groove or key way. The axis of second axial groove 60 is substantially parallel to the optical axis of the lens within the lens housing 14.

A coupler in the form of a square pin or key 56 may be used to couple the lens housing 14 to stop adaptor 36. In an alternative embodiment, key 56 may be a round pin or key. Key 56 fits into first axial groove 54A, 54B and also fits into second axial groove or key way 60 in stop adaptor 36. In an exemplary embodiment, key way 60 may be square shaped. In an alternative embodiment, key way 60 may be semicircular. When key 56 is inserted into both the first axial groove, 14A, 54B and the second axial groove 60, there is no rotational movement of lens housing 14 relative to stop adaptor 36. The key operates as a lock to prevent the objective cell from rotating relative to the optical system.

To assemble the device, stop adaptor 36 is threaded into knob 28. O-ring 52 is then assembled into circumferential groove 50 on lens housing 14. Afterward, knob 28 is snapped into position using the chamfered lip on its leaving edge into circumferential snap-in groove 48. Knob 28 compresses O-ring 52 radially. O-ring 52 provides friction between knob 28 and lens housing 14 making a tight rotational fit between the knob and the lens housing. In alternative embodiments, pre-loading may be accomplished using compression-style washers, springs, or resilient foam. In an exemplary embodiment, O-ring 52 provides a torque value in the range of 10 to 60 inch-ounces. Knob 28 rotates over O-ring 52. But the 10 to 60 inch-ounce torque requirement prevents the knob from floating and turning freely.

After knob 28 is snapped onto lens housing 14, the key way 60 in stop adaptor 36 is aligned with the axial groove 54A, 54B in lens housing 14. When the two axial grooves have been aligned, key 56 is slid into keyway 60 and then into axial groove 54A, 54B. The key 56 is long enough so that it extends within the full length keyway 60 and the full length of axial groove 54A, 54B. Sealing O-ring 46 is then installed into circumferential groove 24. This subassembly may then be assembled into a night vision device.

In operation, knob 28 may be rotated one turn relative to stop adaptor 36 because of the mating relationship between threads 30 on knob 28 and threads 38 of stop adaptor 36. Although knob 28 rotates around O-ring 52 and rotates relative to stop adaptor 36, rotations of knob 28 do not cause rotation of lens housing 14 relative to stop adaptor 36 because key 56 and axial grooves 54A, 54B, 60 prevent relative motion of lens housing 14 relative to stop adaptor 36. Thus, it can be seen that key 56 couples lens housing 14 to stop adaptor 36 to prevent lens housing 14 from rotating relative to stop adaptor 36 when knob 28 is rotated relative to stop adapter 36 and relative to the night vision system that is coupled to stop adapter 36. The key and the axial grooves act as a lock to prevent the objective cell from rotating relative to the night vision system. However, rotation of knob 28 causes the knob to thread and unthread from the stop adaptor. This threading and unthreading provides a small translation motion to the lens housing relative to the stop adaptor. Since the lens housing and the lenses carried by lens housing 14 are rotationally secured to stop adaptor 36, the lenses translate but do not rotate relative to stop adapter 36 and relative to the night vision system that is coupled to stop adapter 36.

Figure 6A:
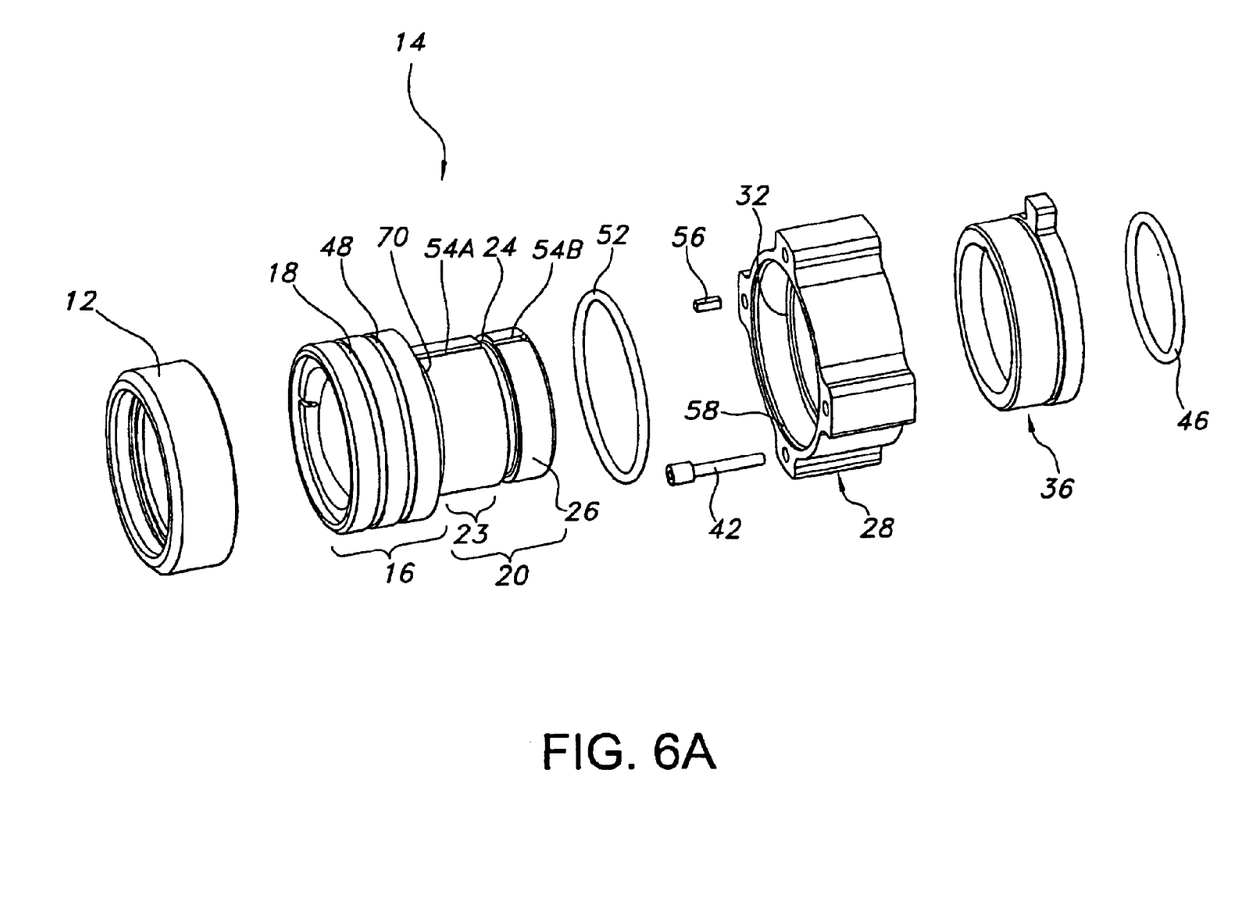
FIG. 6(a) is an exploded perspective view of a device for focusing an objective lens according to an second embodiment of the present invention.
Figure 6B:
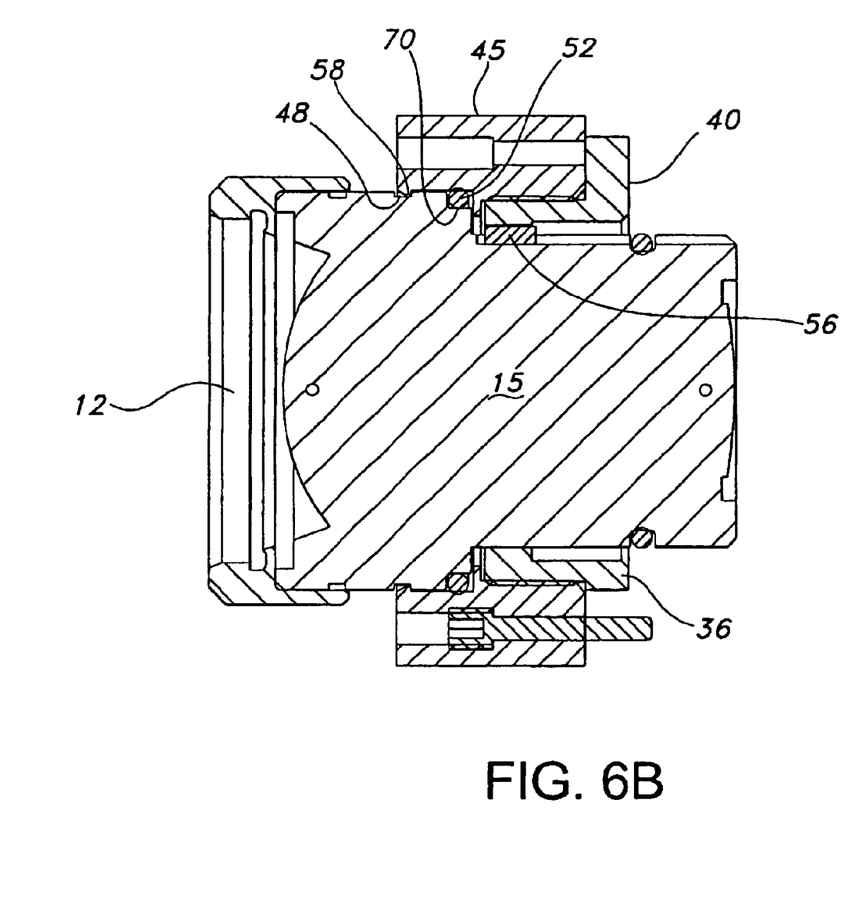
FIG. 6(b) is a cross-sectional view of the device illustrated in FIG. 6(a)

FIG. 6(a) is an exploded perspective view of a second embodiment of the invention and FIG. 6(b) is a cross sectional view of the device illustrated in FIG. 6(a). In this embodiment, groove 50 for O-ring 52 has been removed. Instead, a face groove 70 is provided on a face of segment 16 that faces segment 20 of objective lens housing 14. Face groove 70 is open toward segment 20 and knob 28. O-ring 52 is positioned in face groove 70. Knob 28 is mounted onto lens housing 14 by snapping circumferential protrusion 58 into circumferential snap-in groove 48. When knob 28 engages lens housing 14, circumferential stop 32 of knob 28 pushes directly against O-ring 52. As a result, O-ring 52 becomes sandwiched between a wall of face groove 70 and circumferential stop 32 thereby axially compressing O-ring 52 between face groove 70 and circumferential stop 32. This embodiment provides friction and some axial pre-load between the knob and the objective cell to reduce system play between the objective cell and the knob.

Figure 7A:
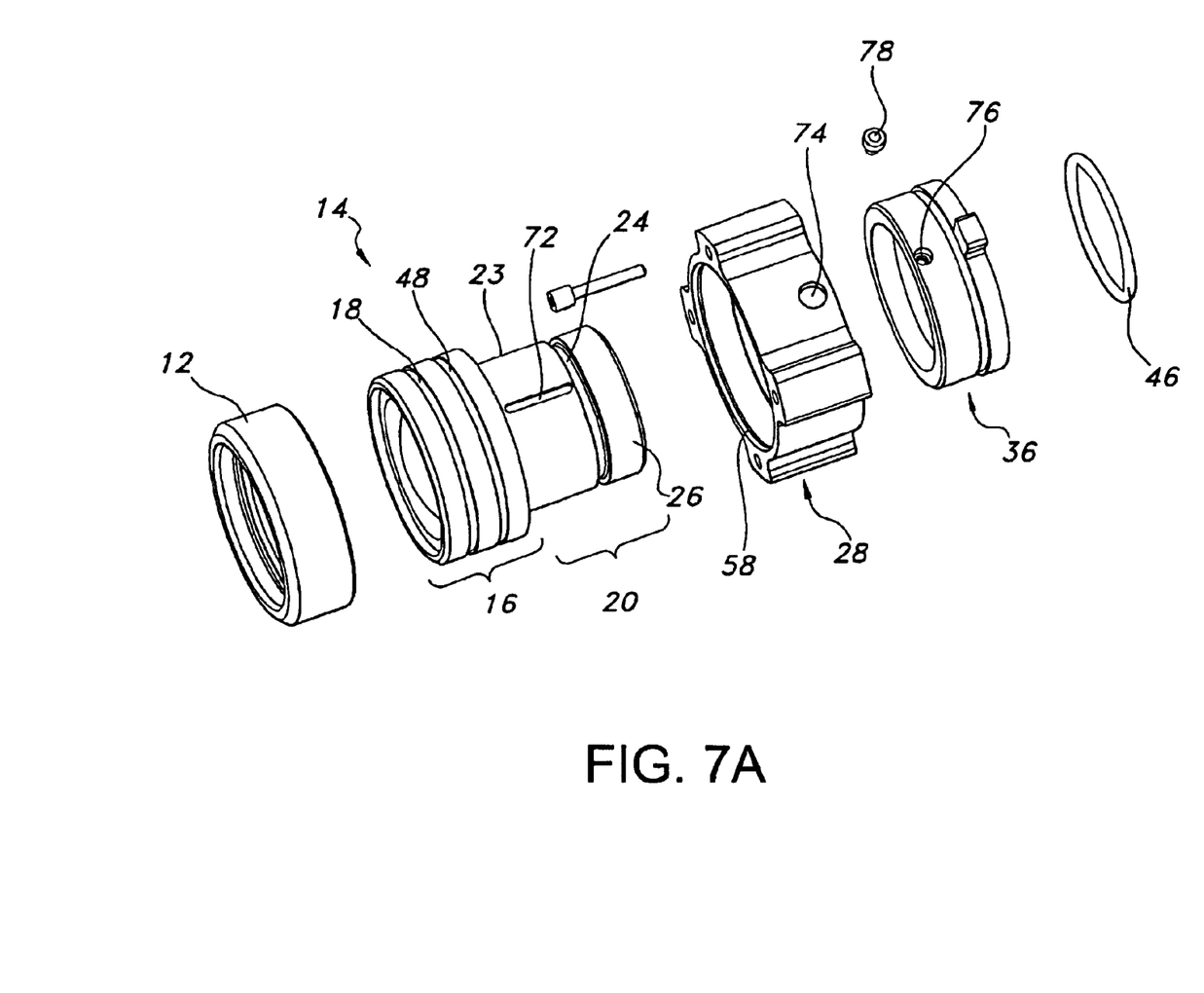
FIG. 7(a) is an exploded perspective view of a device for focusing an objective lens according to a third embodiment of the present invention.
Figure 7B:
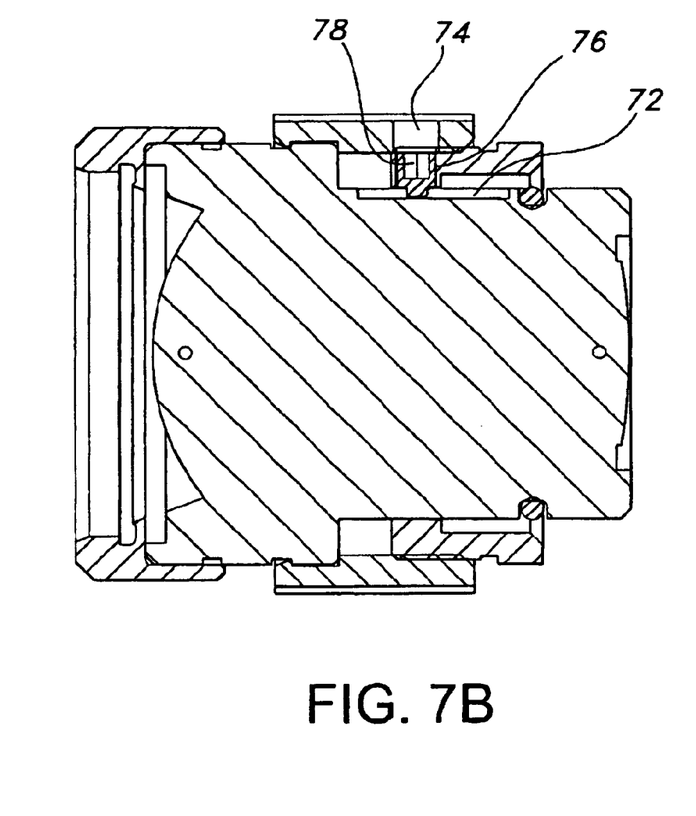
FIG. 7(b) is a cross-sectional view of the device illustrated in FIG. 7(a)

FIG. 7(a) is an exploded perspective view of a third embodiment of the present invention and FIG. 7(b) is a cross sectional view of the third embodiment illustrated in FIG. 7(a). Instead of providing an axial groove in the objective cell, the third embodiment provides a first channel, or slot 72. Slot 72 is disposed in an outer surface of part 23 in a direction that is parallel to the optical axis of the lens inside the objective cell. Instead of providing an axial groove in the stop adapter 36, a second channel, or opening, 76 is provided. Opening 76 penetrates through one wall of stop adapter 36. Opening 76 does not penetrate the diametrically opposite wall of stop adapter 36. A third channel, or opening, 74 is provided in knob 28. Opening 74 penetrates through one wall of knob 28. Opening 74 does not penetrate the diametrically opposite wall of knob 28. In an exemplary embodiment, the diameter of opening 74 may be greater than the diameter of opening 76.

The O-ring configuration shown in FIGS. 6(a) and 6(b) may also be used in this embodiment. When this O-ring configuration is used, circumferential stop 32 (not shown in this figure) presses against the O-ring 52 placed in face groove 72 (not shown in this figure).

In operation, knob 28 is coupled to objective cell 14 and stop adapter 36 is coupled to knob 28. That is, knob 28 is mounted onto lens housing 14 by snapping circumferential protrusion 58 into circumferential snap-in groove 48; and stop adapter 36 is screwed into knob 28. After these three elements are coupled together, openings 74 and 76 are aligned with each other and both openings are jointly aligned with slot 72. After the three channels are aligned, a set screw may be dropped through larger opening 74 into smaller opening 76 and into slot 72. Set screw 78 is long enough so that it is simultaneously inside opening 76 of stop adapter 36 and slot 72 of objective cell 14. This combination of channels with the set screw allows translation of objective cell 14 without allowing rotation of objective cell 14 relative to stop adapter 36. Translation motion occurs as slot 72 slides over set screw 78. Meanwhile, because set screw 78 is inside both slot 72 and opening 76, the objective cell may not rotate relative to the stop adapter. In an alternative embodiment, a drop-in pin may be used instead of a screw-in set screw. In another alternative embodiment, any other alignment mechanism may be used that would fit into the slot through the holes in the knob and the stop adapter.

Figure 8A:
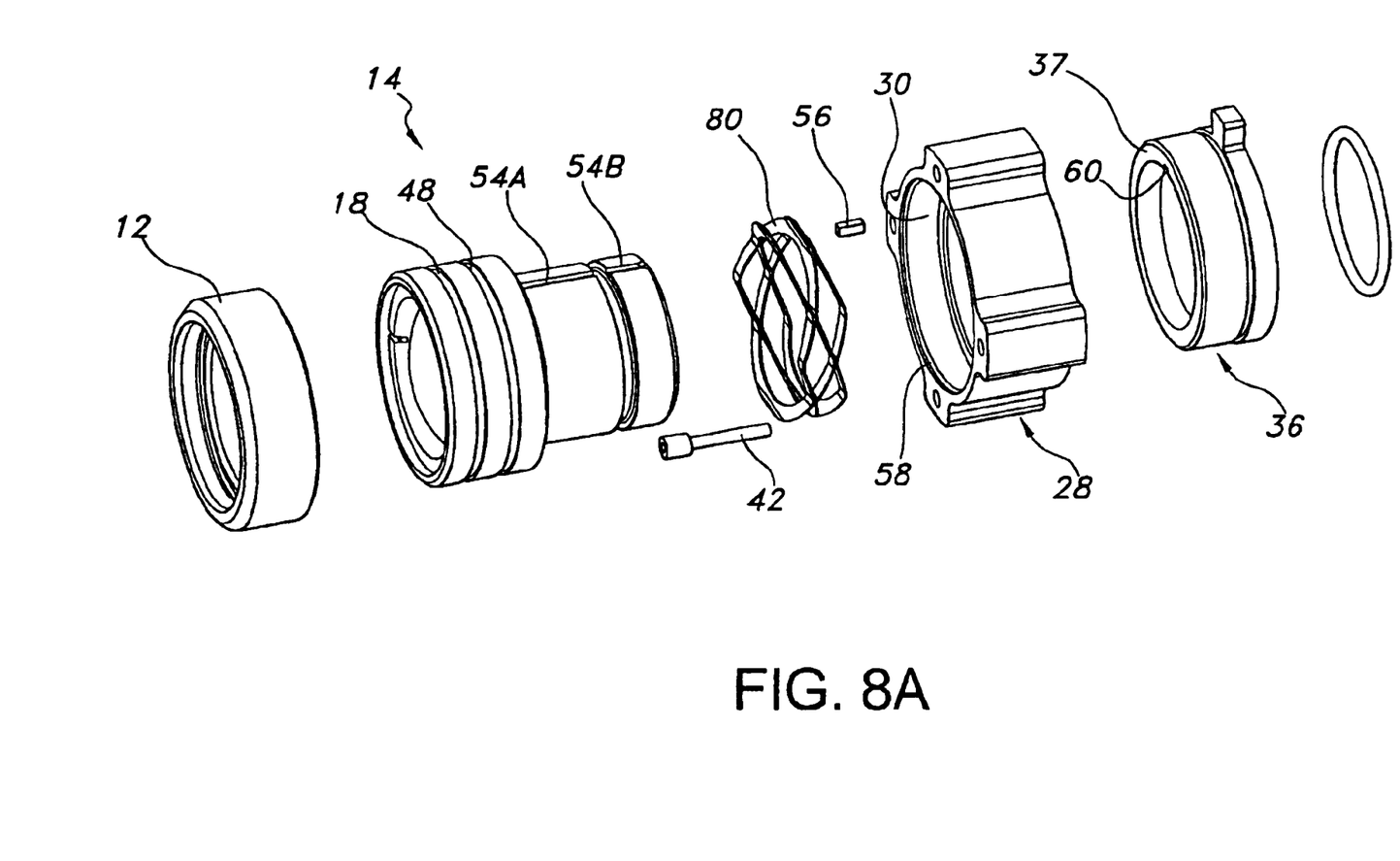
FIG. 8(a) is an exploded perspective view of a device for focusing an objective lens according to a fourth embodiment of the present invention.
Figure 8B:
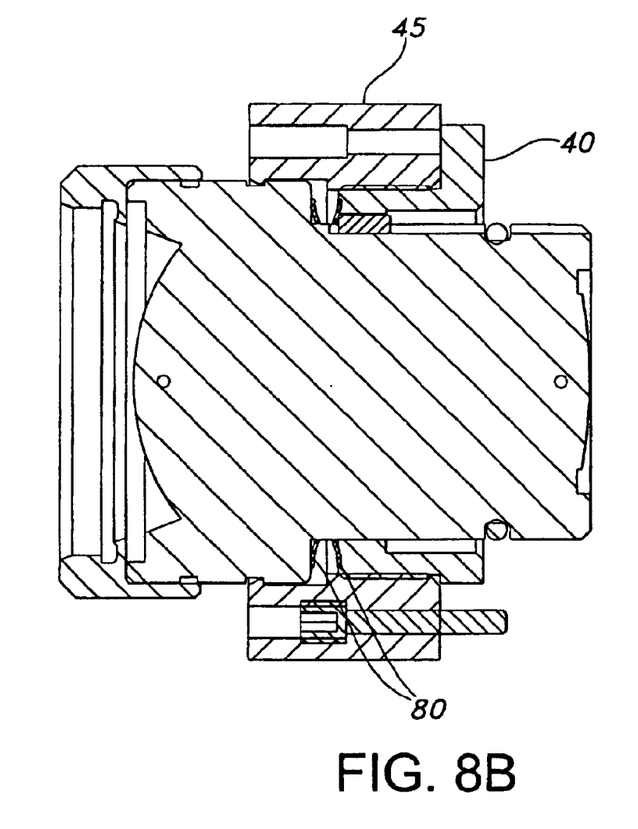
FIG. 8(b) is a cross-sectional view of the device illustrated in FIG. 8(a).

FIG. 8(a) is an exploded perspective view of a fourth embodiment of the present invention and FIG. 8(b) is a cross-sectional view of the device illustrated in FIG. 8(a). This fourth embodiment may use the face groove 70 (not shown in these figures) disclosed in the second embodiment shown in FIGS. 6(a) and 6(b). It also may also use the axial grooves and key disclosed in the exemplary embodiment. O-ring 52, disclosed in FIGS. 3, 4, 6(a) and 6(b), is not used in this embodiment. Consequently, circumferential stop 32 shown in those figures is not used in this embodiment either. Instead of an O-ring 52, this embodiment uses a wave spring 80 mounted onto face groove 70 of the objective cell. Because wave spring 80 is usually wider than an O-ring, face groove 70 is made wider for the fourth embodiment than it is for the second embodiment. After wave spring 80 is installed onto the objective cell and knob 28 is coupled to the objective, stop adapter 36 is screwed into knob 28. As stop adapter 36 is screwed into knob 28, face 37 of stop adapter 36 pushes against wave spring 80, providing an axial compressive force against wave spring 80 and against the objective cell. As knob 28 rotates relative to stop adapter 36, stop adapter 36 and objective cell 14 translate against and away from wave spring 80. The axial compressive force provided by wave spring 80 pre-loads stop adapter 36 and eliminates backlash that might otherwise be present in the coupling between knob 28 and stop adapter 36. That is, it eliminates delay rotation that might otherwise be required in order for engagement between knob 28 and stop adapter 36 to actually result in translation of the objective cell. In an alternative embodiment. A wavy washer or any preload compression device may be used instead of wave spring 80.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A device for adjusting the position of a lens along an optical axis of the lens, the device comprising:
 a lens housing for carrying the lens;
 a first knob positioned to rotate about the lens housing;
 a second knob cooperatively threaded to the first knob such that rotation of the first knob relative to the second knob causes axial movement of the lens housing along the optical axis; and
 a coupler for coupling the lens housing to the second knob to prevent the lens housing from rotating relative to the second knob when the first knob is rotated.

2. The device of claim 1, wherein the lens housing defines a channel adapted to receive the coupler.

3. The device of claim 2, wherein the channel is an axial groove in a surface of the lens housing.

4. The device of claim 1, wherein the second knob defines a channel adapted to receive the coupler.

5. The device of claim 4, wherein the channel is an opening in a surface of the second knob.

6. The device of claim 1, wherein the lens housing defines a first channel, the second knob defines a second channel, and the coupler extends between the first and second channels.

7. The device of claim 6, wherein the coupler couples the first channel to the second channel.

8. The device of claim 6, wherein the first and second channels are disposed axially adjacent each other.

9. The device of claim 6, wherein the first and second channels are disposed radially adjacent each other.

10. The device of claim 1, further comprising a compression device disposed between the lens housing and the second knob adapted to provide an axial force against the lens housing and the second knob.

11. The device of claim 10, wherein the compression device is mounted onto the lens housing.

12. The device of claim 11, wherein the compression device is an elastic body.

13. The device of claim 11, wherein the compression device is a spring.

14. The device of claim 11, wherein the compression device is a washer.

15. A device for adjusting an objective lens relative to an optical system, the device comprising:
 an objective cell for holding the objective lens;
 a lock coupled to the objective cell and the optical system to prevent the objective cell from rotating relative to the optical system;
 a knob coupled to the objective cell and the lock, the knob being adapted to move the objective cell in a translation direction when the knob rotates about the objective cell.

16. The device of claim 15, wherein the objective cell defines a channel and the lock includes a coupler extending between the channel and the system.

17. The device of claim 15, further comprising a compression device disposed between the objective cell and the system adapted to provide an axial force against the objective cell and the system.

18. The device of claim 17, wherein the compression device is an elastic body.

19. The device of claim 17, wherein the compression device is a spring.

20. The device of claim 17, wherein the compression device is coupled to the objective cell.

* * * * *